(12) United States Patent
Luo et al.

(10) Patent No.: US 12,395,045 B2
(45) Date of Patent: Aug. 19, 2025

(54) CHOKE DEVICE FOR AN ELECTRIC MACHINE SYSTEM

(71) Applicant: GM GLOBAL TECHNOLOGY OPERATIONS LLC, Detroit, MI (US)

(72) Inventors: Yilun Luo, Ann Arbor, MI (US); Chandra S. Namuduri, Troy, MI (US); Suresh Gopalakrishnan, Troy, MI (US); Muhammad H. Alvi, Troy, MI (US); Azadeh Narimissa, Lake Orion, MI (US); William T. Ivan, Shelby Township, MI (US); Saranraj Karuppuswami, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 18/164,572

(22) Filed: Feb. 4, 2023

(65) Prior Publication Data

US 2024/0266924 A1 Aug. 8, 2024

(51) Int. Cl.
*H02K 11/01* (2016.01)
*H02K 11/02* (2016.01)
*H02K 11/30* (2016.01)

(52) U.S. Cl.
CPC ............ *H02K 11/02* (2013.01); *H02K 11/01* (2016.01); *H02K 11/30* (2016.01)

(58) Field of Classification Search
CPC ........ H02K 11/00; H02K 11/01; H02K 11/02; H02K 11/04; H02K 11/30; H01R 25/00; H01R 25/14; H01R 25/145; H01F 37/00; H01F 27/00; H01F 27/02; H01F 27/025; H01F 27/06

See application file for complete search history.

(56) References Cited

U.S. PATENT DOCUMENTS 4,378,539 A * 3/1983 Swanson .............. H03H 1/0007
333/185
2010/0039201 A1* 2/2010 Smalen ................... H01F 37/00
336/170

FOREIGN PATENT DOCUMENTS

JP 4501145 B2 * 7/2010

* cited by examiner

*Primary Examiner* — Tran N Nguyen
(74) *Attorney, Agent, or Firm* — Quinn IP Law

(57) ABSTRACT

A choke device for an electric machine system is provided. The choke device includes a common-mode choke including a magnetic core configured in cross-section as a geometric shape including a hollow center. The choke device further includes a plurality of electric transmission lines configured for transmitting electrical energy in alternating current, wherein the plurality of electric transmission lines is routed through the hollow center. The geometric shape includes a number of sides based upon a number of the electric transmission lines present and is configured for minimizing or reducing an overall flux length of the magnetic core.

20 Claims, 13 Drawing Sheets

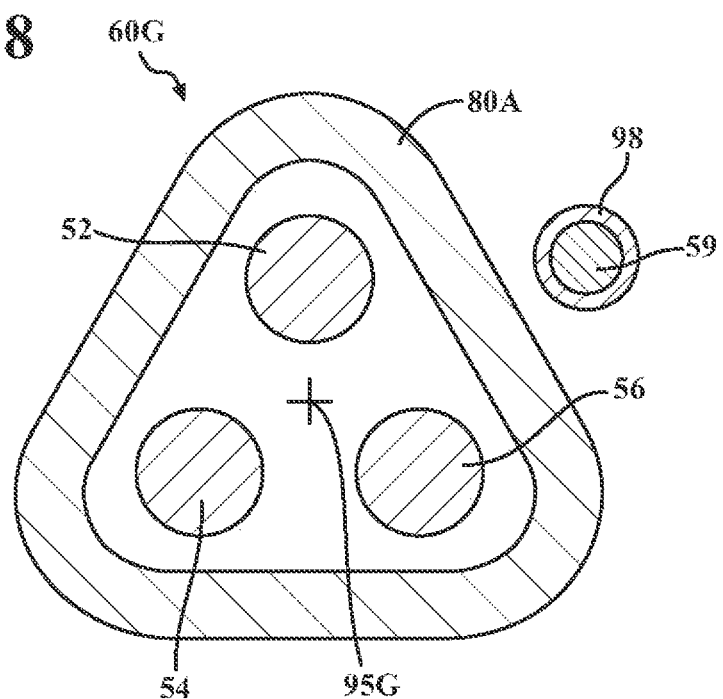
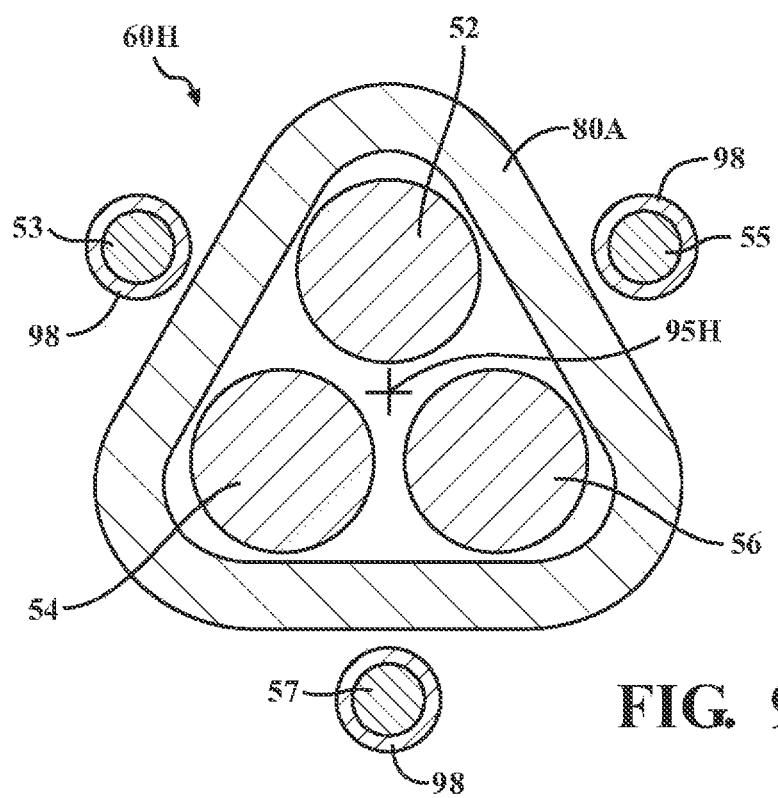

CHOKE DEVICE FOR AN ELECTRIC MACHINE SYSTEM

INTRODUCTION

The disclosure generally relates to a choke device for mitigating bearing current and common-mode current issues for an electric machine system.

An electric machine system may include an electric machine or motor configured for generating an output torque from electrical energy supplied to the electric machine in alternating current. The alternating current may be supplied in phases, for example, in three phases. The electric machine may operate in reverse, receiving an input torque and providing electrical energy in alternating current. The electric machine system may include a battery configured for storing electrical energy. The battery may be configured to provide and receive electrical energy in direct current. A multi-phase power inverter may be utilized to transform electrical energy in direct current into electrical energy in alternating current, and vice versa.

A choke is an electronic device including an inductor useful for blocking or filtering high frequency alternating current fluctuations while allowing low frequency alternating current signals to pass.

SUMMARY

A choke device for an electric machine system is provided. The choke device includes a common-mode choke including a magnetic core configured in cross-section as a geometric shape including a hollow center. The choke device further includes a plurality of electric transmission lines configured for transmitting electrical energy in alternating current. The plurality of electric transmission lines is routed through the hollow center. The geometric shape includes a number of sides based upon a number of the electric transmission lines present and is configured for minimizing or reducing an overall flux length of the magnetic core.

In some embodiments, the plurality of electric transmission lines is symmetrically arranged and configured for equally coupled fields, a same proximity effect among the plurality of electric transmission lines, a minimized zero sequence current, and a voltage which reduces a common-mode current.

In some embodiments, the plurality of electric transmission lines include symmetric shielding, are equally distant from each other, and are equally distant from the common-mode choke. The plurality of electric transmission lines is further configured for coherently adding magnetic fields or flux through the common-mode choke and for strengthening the choke in balance, increasing a total inductance, and providing impedance to the common-mode current.

In some embodiments, the choke device further includes dielectric material configured for increasing a permeability of the choke device to increase inductance.

In some embodiments, the choke device further includes thermally conductive material configured for removing heat from the choke device.

In some embodiments, the plurality of the electric transmission lines includes bus bars.

In some embodiments, the bus bars outside of the choke device bend inwardly to route through the common-mode choke and are configured for reducing flux length to increase inductance.

In some embodiments, the bus bars are relatively thicker outside of the choke device and are relatively thinner inside of the choke device.

In some embodiments, the bus bars are relatively wider outside of the choke device and are relatively narrower inside of the choke device.

In some embodiments, the plurality of the electric transmission lines is arranged within the choke device such that a centerline of each of the plurality of electric transmission lines is equidistant from a geometric center of the choke device.

In some embodiments, the geometric shape has a same number of sides as the number of the plurality of the electric transmission lines present.

In some embodiments, the choke device further includes a ground conductor routed through the common-mode choke. The geometric shape has a same number of sides as the number of the plurality of the electric transmission lines present plus one.

In some embodiments, one of the plurality of electric transmission lines is coincident with a geometric center of the choke device. A remainder of the plurality of electric transmission lines is equally spaced around the one of the plurality of electric transmission lines. The geometric shape has a same number of sides as the number of the plurality of the electric transmission lines present minus one.

In some embodiments, the choke device further includes a ground conductor coincident with a geometric center of the choke device. A remainder of the plurality of electric transmission lines is equally spaced around the one of the plurality of electric transmission lines. The geometric shape has a same number of sides as the number of the plurality of the electric transmission lines present.

In some embodiments, each of the plurality of electric transmission lines includes shielding and insulation disposed between the electric transmission line and the shielding.

In some embodiments, the common-mode choke includes a vertical lamination including a plurality of stacked ferrite sheets or a horizontal lamination including a spirally wound ferrite sheet or a spirally wound ferrite ribbon.

In some embodiments, the geometric shape includes a triangle, a square, a pentagon, a hexagon, a septagon, an octagon, a nonagon, or a decagon.

In some embodiments, a gap in the magnetic core is maintained. The gap is configured for reducing saturation.

According to one alternative embodiment, a system including a choke device for an electric machine is provided. The system includes a battery configured for receiving and providing electrical energy in direct current and an electric machine configured for receiving and providing electrical energy in a plurality of phases in alternating current. The system further includes a power inverter transforming electrical energy between direct current and alternating current. The system further includes the choke device located between the electric machine and the power inverter. The choke device includes a common-mode choke including a magnetic core configured in cross-section as a geometric shape including a hollow center. The choke device further includes a plurality of electric transmission lines configured for transmitting electrical energy in alternating current. The plurality of electric transmission lines is routed through the hollow center. The geometric shape includes a number of sides based upon a number of the electric transmission lines present and is configured for minimizing or reducing an overall flux length of the magnetic core.

According to one alternative embodiment, a device including a system including a choke device for an electric machine is provided. The device includes the system. The system includes a battery configured for receiving and providing electrical energy in direct current and an electric machine configured for receiving and providing electrical energy in a plurality of phases in alternating current. The system further includes a power inverter transforming electrical energy between direct current and alternating current. The system further includes the choke device located between the electric machine and the power inverter. The choke device includes a common-mode choke including a magnetic core configured in cross-section as a geometric shape including a hollow center. The choke device further includes a plurality of electric transmission lines configured for transmitting electrical energy in alternating current. The plurality of electric transmission lines is routed through the hollow center. The geometric shape includes a number of sides based upon a number of the electric transmission lines present and is configured for minimizing or reducing an overall flux length of the magnetic core.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 8 schematically illustrates in cross-sectional view a seventh exemplary embodiment of the choke device of FIG. 1, in accordance with the present disclosure;

FIG. 9 schematically illustrates in cross-sectional view an eighth exemplary embodiment of the choke device of FIG. 1, in accordance with the present disclosure;

DETAILED DESCRIPTION

Figure 1:
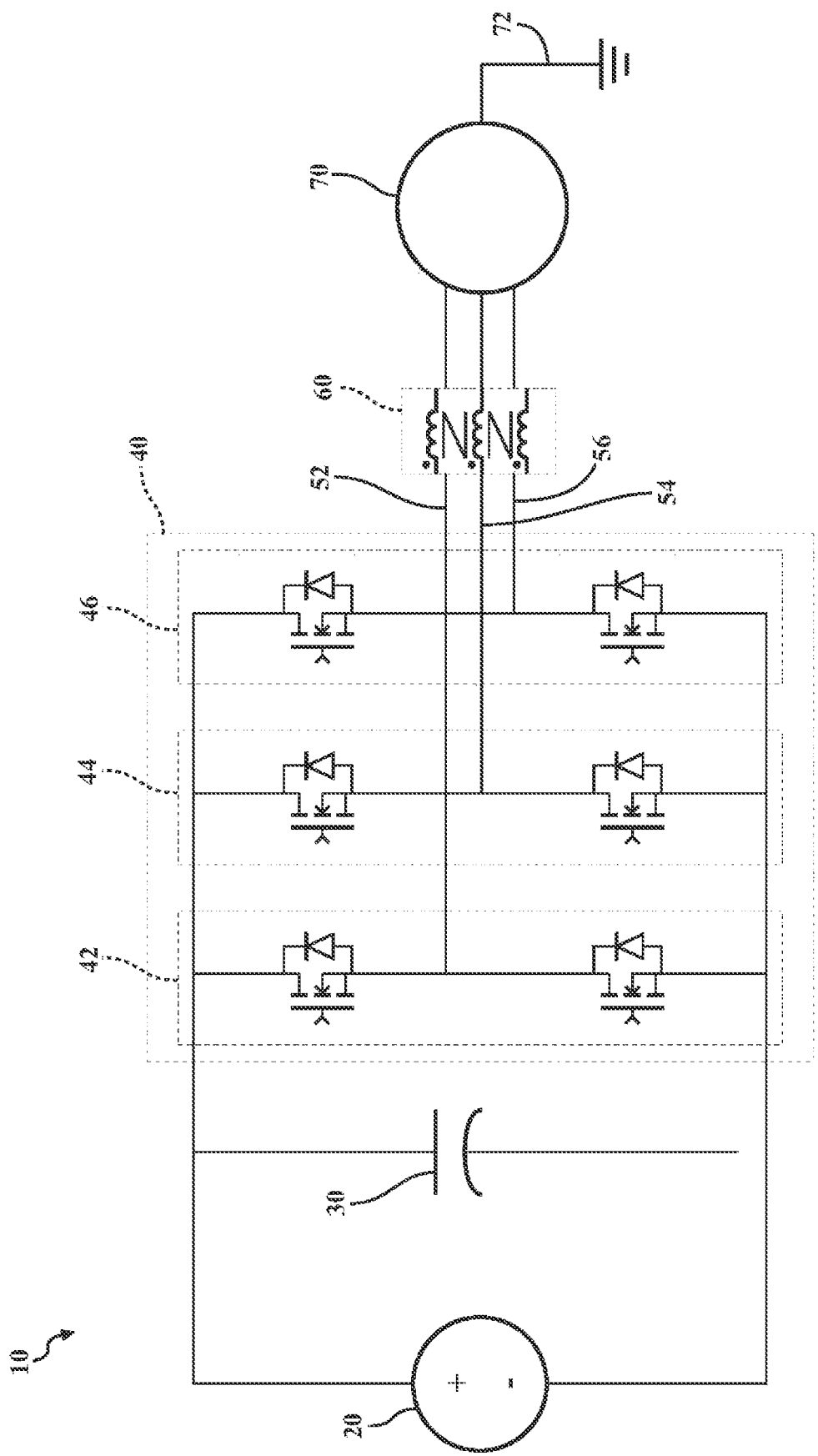
FIG. 1 schematically illustrates electric machine system including a battery, a capacitor, a power inverter, electric transmission lines, a choke device, and an electric machine, in accordance with the present disclosure.

An electric machine system may include a battery, a power inverter, and an electric machine. In one embodiment, the electric machine may include a three-phase, alternating current, electric machine. Each of the three phases may include a dedicated electrical transmission line from one of three phases of the power inverter to a corresponding phase input to the electric machine. Electrical energy may be transferred through each of the electric transmission lines to and from the electrical machine for purposes of providing a useful output torque from the electric machine or recharging the battery based upon converting an input torque to the electric machine into electrical energy. These are the intended flows of electrical energy in alternating current, providing useful functions of the electric machine system. The intended flows of electrical energy in alternating current flowing through the electric transmission lines may generate electromagnetic interference (EMI) which may in turn induce one or more unintended flows of energy, for example, within the electric machine and power inverters and other electronics in the vehicle. Bearing current may be described as current flowing through conductive structures within the electric machine including the bearings connecting the electric machine shaft to the static housing of the electric machine. Bearing current may cause deformation to surfaces of the bearings within the electric machine, may reduce a useful lifespan of the electric machine, and may cause inefficiency or motor loss. Bearing current may additionally flow into the gears connected to the motor shaft and cause electrical damages to gear bearings and the gears.

A choke device including a common-mode choke may be utilized to filter or reduce high frequency signals from the electric transmission lines. A common-mode choke may be described as one or more conductive windings about a magnetic core with a closed, hollow shape (e.g., a circle, a rounded triangle, a rounded square, etc. with a cavity in the middle thereof). Net current in the electric transmission lines is disposed through a center of the common-mode choke magnetic flux or flux in the magnetic core. The three-phase current through the common-mode choke sum to zero, which create flux canceling each other in the core, resulting in a low differential-mode inductance or close to zero magnetic flux from phase currents. The common-mode (CM) currents, however, strengthen each other's fluxes in the core, leading to a high common-mode inductance. The common-mode choke may effectively reduce CM current and bearing current to mitigate deformation, reduced lifespan, and motor loss.

Bearing current and EMI are challenging problems for battery, hybrid, or fuel cell electric vehicles, as well as for generators, ships, trains, and wind turbines. Bearing current and gear current may cause reduced useful lifespans to motor bearings, gear bearings, gears, and lubricants. Bearing current and gear current may additionally result in undesirable audible noise, vibrations, and eventually cause catastrophic bearing failure. EMI can cause several problems for the electronic equipment in the vehicle, including noise, damage to components, malfunctions, and errors in the equipment.

A choke device utilized in the art may include a plurality of electric transmission lines which run from a power inverter to an alternating current electric machine. Wherein the electric machine is a three-phase electric machine, three electric transmission lines pass through the chock device. The choke device further includes a common-mode choke which include conductive wire windings upon a magnetic core. The magnetic core may include a closed, hollow geometric shape such as a circle, or a rectangle with a through hole formed in a middle of the shape. The common-mode choke includes flux from net current flow which is the sum of the currents going through the choke. Since phase currents add to zero, the flux form phase current is zero. However, CM current in each of the conductors is in the same direction and adds up leading to flux which impedes CM current.

The choke device of the present disclosure achieves relatively high inductance using one of a plurality of provided compact shapes to minimize the overall flux path length and maximize cable field coupling. The choke device includes tightly packaged electric transmission lines, such as cables or bus bars, to reduce the cross-sectional circumferential flux path and enable closer, stronger, and more symmetrical cable field coupling. The choke device supports packaging flexibility and may be installed on cables or bus bars inside the power inverter, within or upon the electric machine, or in between the power inverter and the electric machine. The choke device may filter CM currents to reduce EMI, bearing current, and avoid reduced lifespan of the electric machine and drive system. The choke device also filters out circulating bearing current, or together with a shaft grounding device to filter electric discharge machining (EDM) bearing current, to protect motor bearings and gears from deformation.

The tightly packaged choke device, or the common-mode choke of the choke device, may include a shape based upon the number of electric transmission lines enclosed within a hollow area of the choke device. With the plurality of electric transmission lines tightly packed, the shape of the choke device may be selected to conform to the outer shape of the electric transmission lines. For example, if three electric transmission lines is enclosed, the shape may be a triangle. The three electric transmission lines may be equidistant from a geometric center of the choke device. In another example, if four electric transmission lines are enclosed, the shape may be a square. The four electric transmission lines may be equidistant from the geometric center of the choke device. In another example, if five electric transmission lines are enclosed, the shape may be a pentagon. The five electric transmission lines may be equidistant from the geometric center of the choke device. Similarly, larger numbers of electric transmission lines may be utilized with a choke device with a matching number of sides to the number of electric transmission lines. In the above examples, one or more of the electric transmission lines may be replaced with a ground line or ground conductor.

In another embodiment, one electric transmission line of a plurality of electric lines may be coincident with a center of a choke device, and a remainder of the plurality of electric lines may be equally spaced around the one electric line. A choke device may be utilized in such an embodiment, wherein a shape of the choke device may have a number of sides equal to the number of electric transmission lines minus one. For example, in an embodiment where four electric transmission lines are present, with one in a center position and with three electric transmission lines equally spaced around the one in the center position, a choke device disposed around the four electric transmission lines may have three sides or be a triangle. In another example, where six electric transmission lines are present, with one in a center position and with five electric transmission lines equally spaced around the one in the center position, a choke device disposed around the four electric transmission lines may have five sides or be a pentagon. In the above examples, one or more of the electric transmission lines may be replaced with a ground line or ground conductor. In one example, in order to provide symmetry, a single ground line may be coincident with the center of the choke device, and the electrical transmission lines may be equally spaced around the ground line. In another example, a plurality of electric transmission lines may be equally spaced around a center position, and a plurality of ground lines may be equally spaced around the center position.

In another embodiment, additional pairs or sets of electric transmission lines that are equidistant from a geometric center of the choke device may be added to either of the above embodiments. For example, wherein ten electric transmission lines are present, one electric transmission line may be present in a center position, six of the electric transmission lines may be equally spaced around the one electric transmission line, and three additional electric transmission lines may be equally spaced around the six transmission lines.

The disclosed choke device including a common-mode choke by geometric positioning of electric transmission lines and tightly wrapped choke to form the optimal geometry, achieving relatively high inductance, relatively low cost, and relatively small size as compared to configurations in the art. By closely positioning the electric transmission lines within the choke device, the electric transmission lines may be field coupled. Field coupling or inter-cable coupling improves phase field cancelation for the common-mode current. Further, by closely positioning the electric transmission lines within the choke device, an overall size of the common-mode choke disposed around the electric transmission lines may be reduced or minimized to reduce or minimize the overall flux path or magnetic flux loop length around the electric transmission lines. A reduced or minimized flux path or magnetic flux loop length increases inductance of the common-mode choke and amplitude of the flux. Choke inductance (L) of the disclosed choke device describes its ability to impede change of current or high-frequency current, and may be calculated for an ideal winding wound on a toroidal core by Equation 1 as follows.

$$L \propto \frac{N^2 A_e \mu}{L_e} \quad (1)$$

The term N describes the number of turns of the winding. The term $A_e$ describes effective cross-sectional area of the core. The term u describes permeability of the core. The term Le describes effective magnetic flux path length, which is approximately the centerline length of the core. In some embodiments, a CM choke may increase the inductance by using high u material for the core and increasing $A_e$, which in turn increases the cost and size. The disclosed choke device including closely positioned electric transmission lines and minimized flux path may increase L by approximately 25% as compared to a choke where the electric transmission lines are disposed linearly side-by-side or in choke devices with a rectangular cross-section.

In one embodiment, geometric positioning of the electric transmission lines are configured to make centerlines of each of the electric transmission lines as close to each other as possible. In one embodiment, geometric positioning may include disposing each of three electric transmission lines within the choke device such that each of the electric transmission lines is equidistant from a geometric center of the choke device. By disposing the electric transmission lines at equidistant positions from a geometric center of the choke device, this symmetric cable or bus bar arrangement enable equal, closer, and stronger inter-cable and cable-choke couplings between the phases of the electric transmission lines. This symmetric arrangement of the electric transmission lines acting as phase conductors, and optionally additionally one or a plurality of ground connectors, enhances and balances field coupling, with an effect to increase common-mode inductance in the common-mode choke. When the electric transmission lines are cables with round cross-sections and when there are three electric transmission lines, this geometric positioning wherein each of the electric transmission lines is equidistant from the geometric center of the choke device results in the electric transmission lines being in a triangular shape within the choke device. In order to minimize the overall flux length of the common-mode choke disposed around the three electric transmission lines, the magnetic core of the common-mode choke may include a round or triangular cross-section to increase inductance.

By coupling the electric transmission lines close together, differential-mode inductance may be decreased.

In one embodiment, cable shielding may be utilized to increase inductance by optimizing field coupling with the core. The shielding provides a controlled path for the drive's CM current (limiting the current traveling through to the ground grid). The shielding also provides a continuous shield over the entire cable from the inverter to the motor, minimizing the amount of EMI radiation that radiates from the cable which can cause interference with other systems. Further, the return current of the CM current or bearing current flows through the cable shielding in the opposite direction to the CM current/bearing current in the phase cables. Placing the shielding and phase cables on the opposite side of the magnetic core adds up their generated magnetic fields and therefore increases the total inductance impeding the common-mode current.

In one embodiment, dielectric material may be filled between cable/bus bar inside the choke or insulation may be added on the electric transmission lines to enhance permeability and/or high-voltage isolation to bring them closer to each other to reduce flux path length.

In one embodiment, twisted electric transmission lines may be utilized to enhance inter-cable and cable-core coupling to improve inductance.

In one embodiment, a gap may be maintained between the electric transmission lines to avoid saturation.

Embodiments of the disclosed choke device may include three electric transmission lines corresponding to a three-phase system. However, the same benefits of closely positioning or geometrically positioning the electric transmission lines may be utilized with different systems, for example, including a two-phase system or a system including more than three phases. For example, a five-phase system may include a pentagon shaped choke and pentagon shaped cross-section of electric transmission lines passing through the choke device. In another example, a six-phase system may incorporate a hexagon shaped choke and pentagon shaped cross-section of electric transmission lines passing through the choke to achieve the minimal flux length. In the alternative, the six-phase system may utilize two choke devices in parallel, each including triangle shaped cross-sections of electric transmission lines passing through the choke device.

In one embodiment, a plurality of the disclosed choke devices may be utilized in combination to mitigate circulating bearing current along with a shaft grounding device on a single side or two on each side of the motor rotor shaft, such as brush, to mitigate EDM bearing current.

FIG. 1 schematically illustrates electric machine system 10 including a battery 20, a capacitor 30, a power inverter 40, electric transmission lines 52, 54, 56, a choke device 60, and an electric machine 70. The battery 20 is configured to provide and receive electrical energy in direct current. The power inverter 40 is illustrated as an exemplary three-phase power inverter, including a first phase circuit 42, a second phase circuit 44, and a third phase circuit 46. In other systems with different numbers of phases, different numbers of phase circuits will be present. For each phase present in the power inverter 40, an electric transmission line 52, 54, 56 will be present. Each electric transmission line 52, 54, 56 conducts one phase of electrical energy in alternating current between the power inverter 40 and the electric machine 70.

The choke device 60 is illustrated. The choke device 60 includes common-mode choke including a magnetic core with a hollow middle portion or a through hole formed therethrough. Described another way, the magnetic core includes an outer edge forming the overall shape of the magnetic core, and the magnetic core includes an inner edge permitting the electric transmission lines 52, 54, 56 to pass therethrough. The common-mode choke further includes conductive wire windings around the magnetic core.

The electric machine 70 may be described as a motor and may provide a useful output torque from electrical energy in alternating current supplied to the electric machine 70. The electric machine 70 includes a ground circuit 72.

Figure 2:
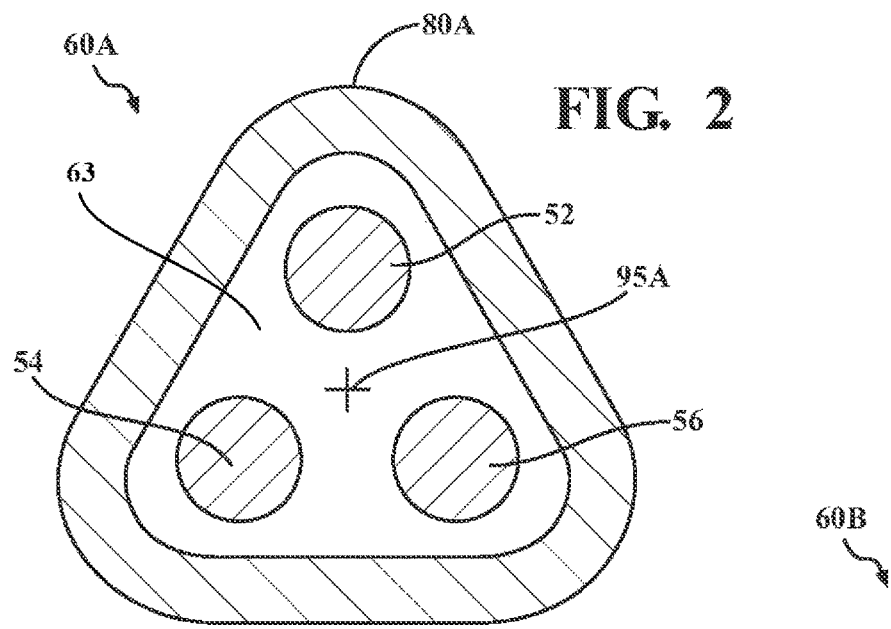
FIG. 2 schematically illustrates in cross-sectional view a first exemplary embodiment of the choke device of FIG. 1, in accordance with the present disclosure.

FIG. 2 schematically illustrates in cross-sectional view a first exemplary embodiment of the choke device 60 of FIG. 1 as choke device 60A. The choke device 60A includes the electric transmission lines 52, 54, 56 configured in geometric positioning or close positioning and further includes a triangle or rounded triangle shaped common-mode choke 80A. Throughout the disclosure, choke devices externally may include sharp corners or rounded corners. The electric transmission lines 52, 54, 56 are disposed equidistant from a geometric center 95A of the choke device 60A. Throughout the disclosure, equidistant disposition or being equidistant from a geometric center may include being symmetrically disposed about or in comparison to the geometric center. This equidistant disposition from the geometric center 95A enables each of the electric transmission lines 52, 54, 56 to have equal inter-cable and cable-choke couplings between the phases of the electric transmission lines 52, 54, 56. By close positioning the electric transmission lines 52, 54, 56, the size of the common-mode choke 80A used to surround the electric transmission lines 52, 54, 56 is minimized, therefore minimizing an overall flux path or flux path length. Dielectric material may optionally be added to a gap 63 between the electric transmission lines 52, 54, 56 to improve permeability (i.e., to increase inductance). In some embodiments, high-voltage isolation may be utilized to make the cables and core closer to further reduce flux length. In another embodiment, air (maintained in a gap between the electric transmission lines 52, 54, 56 by spacers, foam, or other similar mechanism) may be utilized as a low-cost alternative to insulate between the electric transmission lines 52, 54, 56. In another embodiment, the dielectric material in gap 63 may be replaced or augmented with material with high thermal conductivity to reduce core temperature.

Figure 3:
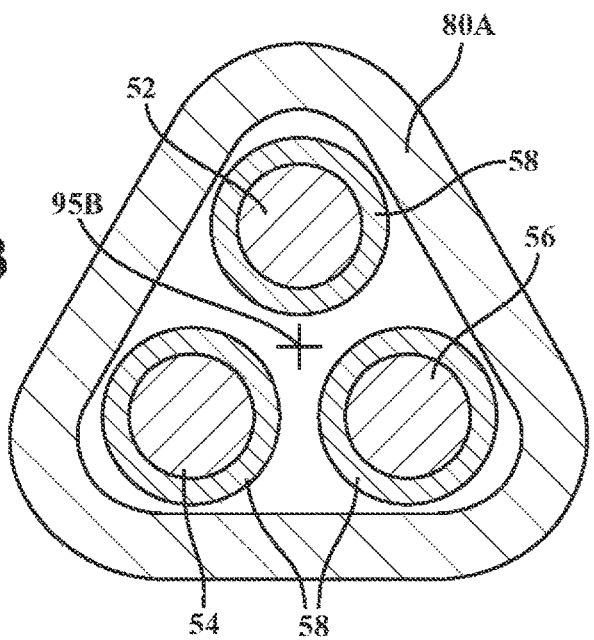
FIG. 3 schematically illustrates in cross-sectional view a second exemplary embodiment of the choke device of FIG. 1, in accordance with the present disclosure.

FIG. 3 schematically illustrates in cross-sectional view a second exemplary embodiment of the choke device 60 of FIG. 1 as choke device 60B. The choke device 60B includes the electric transmission lines 52, 54, 56 configured in geometric positioning or close positioning and further includes the triangle or rounded triangle shaped common-mode choke 80A. The electric transmission lines 52, 54, 56 are disposed equidistant from a geometric center 95B of the choke device 60B. This equidistant disposition from the geometric center 95B enables each of the electric transmission lines 52, 54, 56 to have equal inter-cable and cable-choke couplings between the phases of the electric transmission lines 52, 54, 56. By close positioning the electric transmission lines 52, 54, 56, the size of the common-mode choke 80A used to surround the electric transmission lines 52, 54, 56 is minimized, therefore minimizing an overall flux path or flux path length. The electric transmission lines 52, 54, 56 each additionally include external shielding 58. The shielding 58 provides a controlled path for the inverter's CM current (limiting the current traveling through to the grounded grid). The shielding 58 also provides a shield covering the cable to minimize the EMI radiation from the cable which can cause interference with other systems.

The common-mode noise flowing through the shielding 58 is in the same direction as the phase current flowing through the electric transmission lines 52, 54, 56. As they have the same current flow direction and are on the same side of the choke, their generated magnetic field in the core will add up, strengthen, and, in turn, increase the total inductance impeding the common-mode noise.

The shielding 58 may include armor, copper tape, or a copper braid and aluminum foil combination. An insulation layer is incorporated with the shielding 58 or is provided between the shielding 58 and the electric transmission lines 52, 54, 56 for high voltage isolation.

The shielding 58 prevents EMI coupling to other cables because the radiated emissions are minimal as the shielding completely covers the power wires. The shielding 58 provides a controlled path for the drive's CM current (limiting the current traveling through to the ground grid). The shielding 58 provides a continuous shield over the entire cable from the inverter to the motor (minimizing the amount of EMI radiation that radiates from the cable which may cause interference with other systems).

Figure 4:
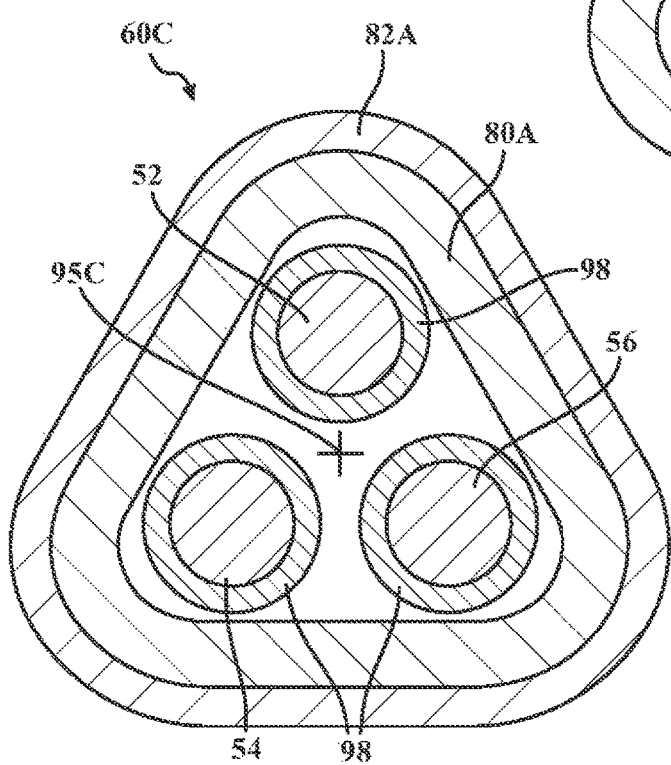
FIG. 4 schematically illustrates in cross-sectional view a third exemplary embodiment of the choke device of FIG. 1, in accordance with the present disclosure.

FIG. 4 schematically illustrates in cross-sectional view a third exemplary embodiment of the choke device 60 of FIG. 1 as choke device 60C. The choke device 60C includes the electric transmission lines 52, 54, 56 configured in geometric positioning or close positioning and further includes the triangle or rounded triangle shaped common-mode choke 80A. The electric transmission lines 52, 54, 56 are disposed equidistant from a geometric center 95C of the choke device 60C. This equidistant disposition from the geometric center 95C enables each of the electric transmission lines 52, 54, 56 to have equal inter-cable and cable-choke couplings between the phases of the electric transmission lines 52, 54, 56. By close positioning the electric transmission lines 52, 54, 56, the size of the common-mode choke 80A used to surround the electric transmission lines 52, 54, 56 is minimized, therefore minimizing an overall flux path or flux path length. The electric transmission lines 52, 54, 56 each additionally include an insulation layer 98, enabling the electric transmission lines 52, 54, 56 to be disposed closer to each other than is desirable without the insulation layer 98. Additionally, shielding 82A is disposed around the common-mode choke 80A.

Figure 5:
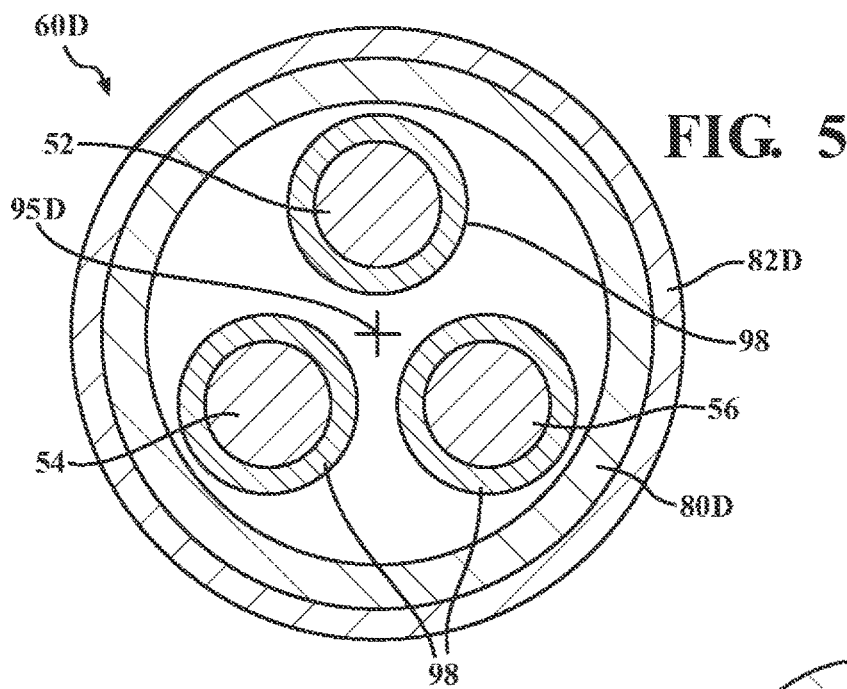
FIG. 5 schematically illustrates in cross-sectional view a fourth exemplary embodiment of the choke device of FIG. 1, in accordance with the present disclosure.

FIG. 5 schematically illustrates in cross-sectional view a fourth exemplary embodiment of the choke device 60 of FIG. 1 as choke device 60D. The choke device 60D includes the electric transmission lines 52, 54, 56 configured in geometric positioning or close positioning and further includes a round shaped common-mode choke 80D. The electric transmission lines 52, 54, 56 are disposed equidistant from a geometric center 95D of the choke device 60D.

This equidistant disposition from the geometric center 95D enables each of the electric transmission lines 52, 54, 56 to have equal inter-cable and cable-choke couplings between the phases of the electric transmission lines 52, 54, 56. By close positioning the electric transmission lines 52, 54, 56, the size of the common-mode choke 80D used to surround the electric transmission lines 52, 54, 56 is minimized, therefore minimizing an overall flux path or flux path length. The electric transmission lines 52, 54, 56 each additionally include an insulation layer 98, enabling the electric transmission lines 52, 54, 56 to be disposed closer to each other than is desirable without the insulation layer 98. Additionally, shielding 82D is disposed around the common-mode choke 80D.

Figure 6:
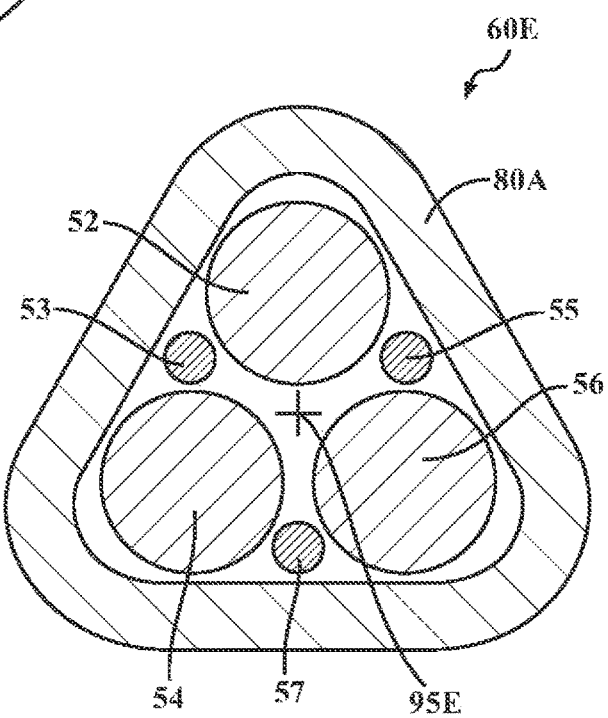
FIG. 6 schematically illustrates in cross-sectional view a fifth exemplary embodiment of the choke device of FIG. 1, in accordance with the present disclosure.

FIG. 6 schematically illustrates in cross-sectional view a fifth exemplary embodiment of the choke device 60 of FIG. 1 as choke device 60E. The choke device 60E includes the electric transmission lines 52, 54, 56 configured in geometric positioning or close positioning and further includes the rounded triangle shaped common-mode choke 80A. The electric transmission lines 52, 54, 56 are disposed equidistant from a geometric center 95E of the choke device 60E. This equidistant disposition from the geometric center 95E enables each of the electric transmission lines 52, 54, 56 to have equal inter-cable and cable-choke couplings between the phases of the electric transmission lines 52, 54, 56. Additionally, ground conductors 53, 55, 57 are illustrated. The ground conductors 53, 55, 57 are illustrated close positioned or packed tightly and symmetrically around the geometric center 95E and are equidistant to the geometric center 95E. By close positioning the electric transmission lines 52, 54, 56 and the ground conductors 53, 55, 57, the size of the common-mode choke 80A used to surround the electric transmission lines 52, 54, 56 is minimized, therefore minimizing an overall flux path or flux path length. The common-mode noise flowing through the ground conductors is in the same direction as the phase current flowing through the electric transmission lines 52, 54, 56. As they have the same current flow direction and are on the same side of the choke, their generated magnetic field in the core will add up and strengthen and in turn increases the total inductance impeding the common-mode noise.

Figure 7:
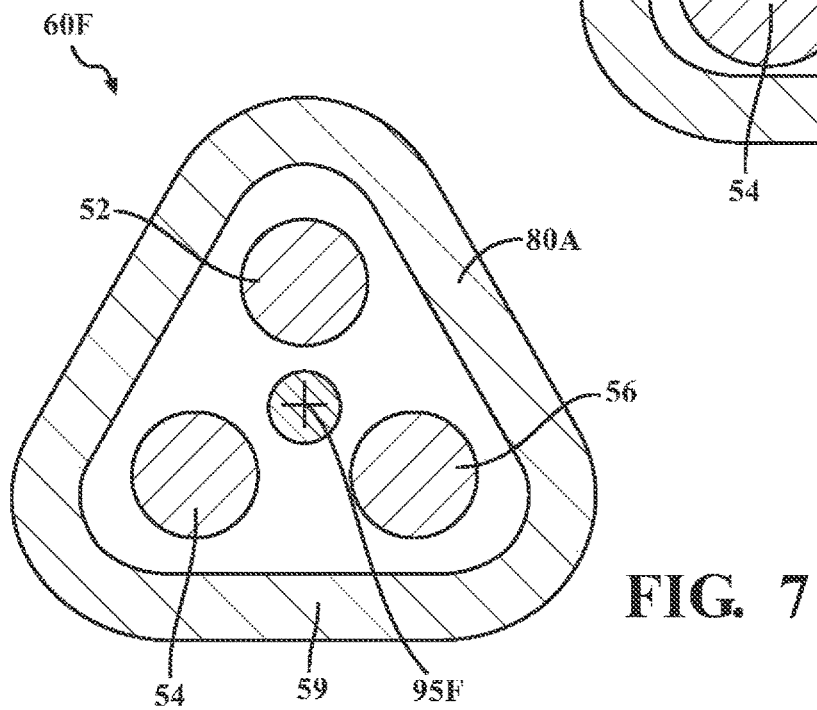
FIG. 7 schematically illustrates in cross-sectional view a sixth exemplary embodiment of the choke device of FIG. 1, in accordance with the present disclosure.

FIG. 7 schematically illustrates in cross-sectional view a sixth exemplary embodiment of the choke device 60 of FIG. 1 as choke device 60F. The choke device 60F includes the electric transmission lines 52, 54, 56 configured in geometric positioning or close positioning and further includes the rounded triangle shaped common-mode choke 80A. The electric transmission lines 52, 54, 56 are disposed equidistant from a geometric center 95F of the choke device 60F. This equidistant disposition from the geometric center 95F enables each of the electric transmission lines 52, 54, 56 to have equal inter-cable and cable-choke couplings between the phases of the electric transmission lines 52, 54, 56. Additionally, a single ground conductor 59 is illustrated disposed with a center of the single ground conductor 59 being coincident with the geometric center 95F. By close positioning the electric transmission lines 52, 54, 56 and the ground conductor 59, the size of the common-mode choke 80A used to surround the electric transmission lines 52, 54, 56 is minimized, therefore minimizing an overall flux path or flux path length.

FIG. 8 schematically illustrates in cross-sectional view a seventh exemplary embodiment of the choke device 60 of FIG. 1 as choke device 60G. The choke device 60G includes the electric transmission lines 52, 54, 56 configured in geometric positioning or close positioning and further includes the rounded triangle shaped common-mode choke 80A. The electric transmission lines 52, 54, 56 are disposed equidistant from a geometric center 95G of the choke device 60G. This equidistant disposition from the geometric center 95G enables each of the electric transmission lines 52, 54, 56 to have equal inter-cable and cable-choke couplings between the phases of the electric transmission lines 52, 54, 56. By close positioning the electric transmission lines 52, 54, 56, the size of the common-mode choke 80A used to surround the electric transmission lines 52, 54, 56 is minimized, therefore minimizing an overall flux path or flux path length. Ground conductor 59 is additionally illustrated disposed outside of the choke device 60G and includes optional insulation layer 98 around the ground conductor 59. The ground conductor 59 doesn't necessarily include shielding. The optional insulation layer 98 is useful to enable bringing the cables and core closer together. The insulation layer 98 minimizes an effect of current flowing through the ground conductor 59 upon the choke device 60G.

FIG. 9 schematically illustrates in cross-sectional view an eighth exemplary embodiment of the choke device 60 of FIG. 1 as choke device 60H. The choke device 60H includes the electric transmission lines 52, 54, 56 configured in geometric positioning or close positioning and further includes the rounded triangle shaped common-mode choke 80A. The electric transmission lines 52, 54, 56 are disposed equidistant from a geometric center 95H of the choke device 60H. This equidistant disposition from the geometric center 95H enables each of the electric transmission lines 52, 54, 56 to have equal inter-cable and cable-choke couplings between the phases of the electric transmission lines 52, 54, 56. By close positioning the electric transmission lines 52, 54, 56, the size of the common-mode choke 80A used to surround the electric transmission lines 52, 54, 56 is minimized, therefore minimizing an overall flux path or flux path length. Ground conductors 53, 55, 57 are additionally illustrated disposed outside of the choke device 60H. Each of the ground conductors 53, 55, 57 includes optional insulation layer 98 around the ground conductor 53, 55, 57. The insulation layer 98 minimizes an effect of current flowing through the ground conductors 53, 55, 57 upon the choke device 60H. The ground conductors 53, 55, 57 are additionally illustrated symmetrically disposed around the choke device 60H and equidistant from the geometric center 95H, such that an effect of each of the ground conductors 53, 55, 57 upon the choke device 60H is equal and symmetrical.

Figure 10:
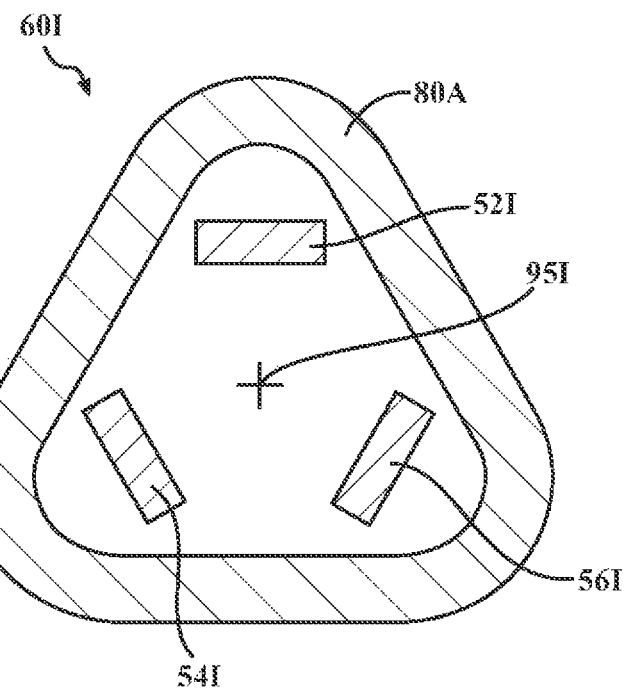
FIG. 10 schematically illustrates in cross-sectional view a ninth exemplary embodiment of the choke device of FIG. 1, in accordance with the present disclosure.

FIG. 10 schematically illustrates in cross-sectional view a ninth exemplary embodiment of the choke device 60 of FIG. 1 as choke device 60I. The choke device 60I includes electric conductors 52I, 54I, 56I configured in geometric positioning or close positioning and further includes a rounded triangle shaped common-mode choke 80A. The electric conductors 52I, 54I, 56I are disposed equidistant from and symmetric to a geometric center 95I of the choke device 60I. The electric conductors 52I, 54I, 56I may be portions of bus bars connecting the power inverter 40 of FIG. 1 to the electric machine 70 of FIG. 1. The electric conductors 52I, 54I, 56I may be conductive terminals spanning the choke device 60I, with the electric transmission lines 52, 54, 56 of FIG. 1 embodied as cables attached to ends of the conductive terminals. This equidistant disposition from the geometric center 95I enables each of the electric conductors 52I, 54I, 56I to have equal inter-cable and cable-choke couplings between the phases of the electric conductors 52I, 54I, 56I. By close positioning the electric conductors 52I, 54I, 56I, the size of the common-mode choke 80A used to surround the electric conductors 52I, 54I, 56I is minimized, therefore minimizing an overall flux path or flux path length.

Figure 11:
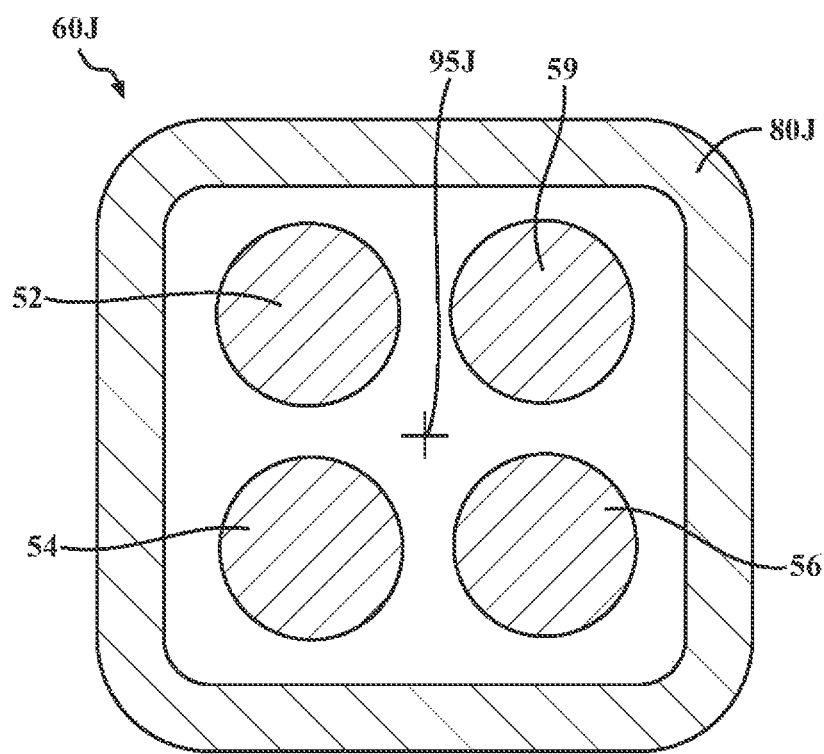
FIG. 11 schematically illustrates in cross-sectional view a tenth exemplary embodiment of the choke device of FIG. 1, in accordance with the present disclosure.

FIG. 11 schematically illustrates in cross-sectional view a tenth exemplary embodiment of the choke device 60 of FIG. 1 as choke device 60J. The choke device 60J includes the electric transmission lines 52, 54, 56 and a ground conductor 59 configured in geometric positioning or close positioning and further includes a rounded square shaped common-mode choke 80J. The electric transmission lines 52, 54, 56 and the ground conductor 59 are disposed equidistant from a geometric center 95J of the choke device 60J. This equidistant disposition from the geometric center 95J enables each of the electric transmission lines 52, 54, 56 and the ground conductor 59 to have equal inter-cable and cable-choke couplings between the phases of the electric transmission lines 52, 54, 56. By close positioning the electric transmission lines 52, 54, 56 and the ground conductor 59, the size of the common-mode choke 80J used to surround the electric transmission lines 52, 54, 56 and the ground conductor 59 is minimized, therefore minimizing an overall flux path or flux path length.

Figure 12:
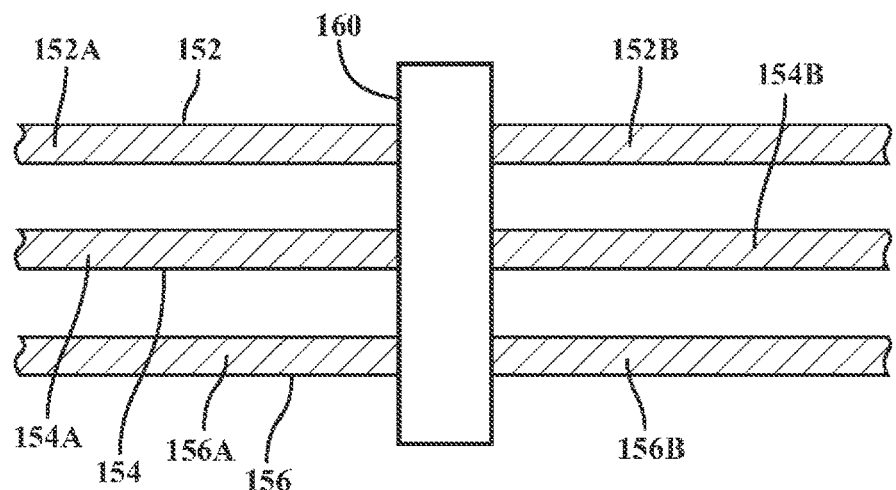
FIG. 12 schematically illustrates in side view a plurality of bus bars routed through a choke device, in accordance with the present disclosure.

FIG. 12 schematically illustrates in side view a plurality of bus bars 152, 154, 156 routed through a choke device 160. The bus bars 152, 154, 156 may be close positioned and disposed closely within the choke device 160. A first portion 152A, 154A, 156A and a second portion 152B, 154B, 156B of the bus bars 152, 154, 156, respectively, are illustrated on opposite sides the of the choke device 160.

Figure 13:
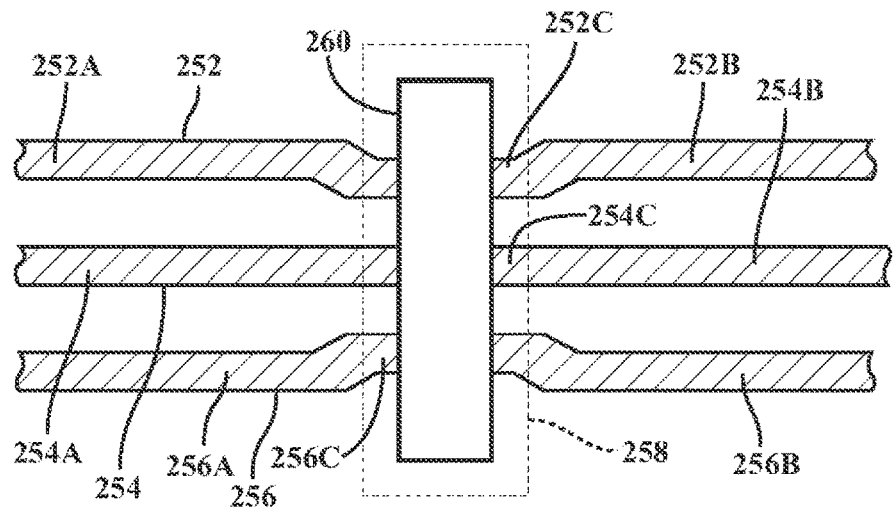
FIG. 13 schematically illustrates in top view a plurality of bus bars routed through a choke device, in accordance with the present disclosure.

FIG. 13 schematically illustrates in top view a plurality of bus bars 252, 254, 256 routed through a choke device 260. The bus bars 252, 254, 256 may be closely positioned and bent to bring them physically closer to each other within the choke device 260. A first portion 252A, 254A, 256A and a second portion 252B, 254B, 256B of the bus bars 252, 254, 256, respectively, are illustrated on the opposite sides of the choke device 260. The bus bars 252, 254, 256 are brought together into a narrow section 258, wherein bus bar portions 252C, 254C, 256C are closely positioned to enable excellent field coupling between bus bars 252, 254, 256 and minimize an overall flow path in the choke device 260.

Figure 30:
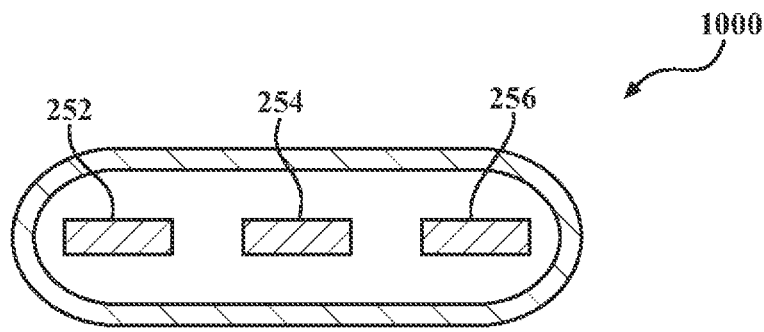
FIG. 30 schematically illustrates in side view a first exemplary embodiment of the choke device of FIG. 13, in accordance with the present disclosure.
Figure 31:
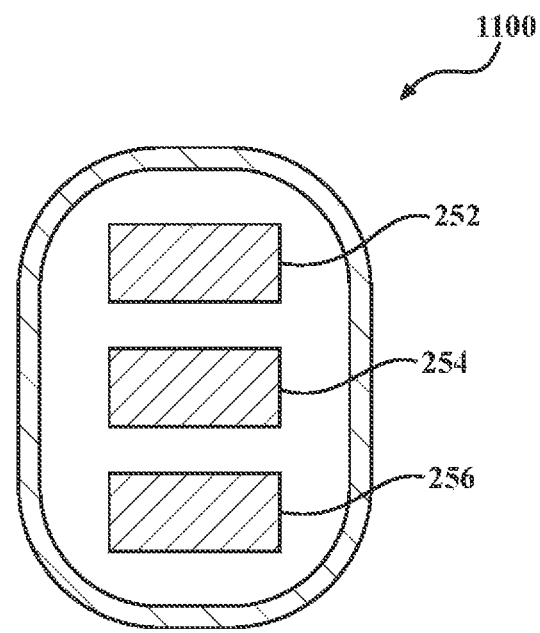
FIG. 31 schematically illustrates in side view a second exemplary embodiment of the choke device of FIG. 13, in accordance with the present disclosure.

FIG. 30 schematically illustrates in side view a first exemplary embodiment 1000 of the choke device 260 of FIG. 13. Bus bars 252, 254, 256 are illustrated in a side-by-side configuration, with at least one thin side edge of each of the bus bars 252, 254, 256 facing a thin side edge of another neighboring one of the bus bars 252, 254, 256. FIG. 31 schematically illustrates in side view a second exemplary embodiment 1100 of the choke device 260 of FIG. 13. Bus bars 252, 254, 256 are illustrated in a vertically stacked configuration, with at least one planar primary surfaces of each of the bus bars 252, 254, 256 facing a planar primary face of another neighboring one of the bus bars 252, 254, 256.

Figure 14:
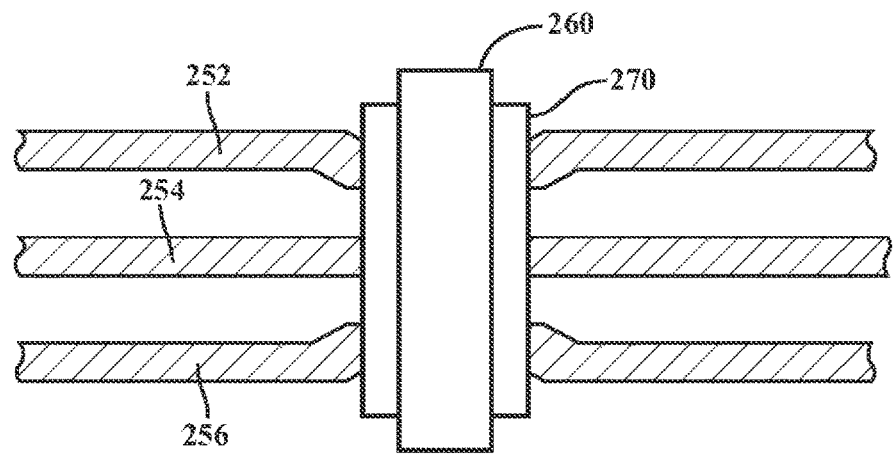
FIG. 14 schematically illustrates the bus bars of FIG. 13, with a dielectric material provided within the choke device and between the bus bars, in accordance with the present disclosure.

FIG. 14 schematically illustrates the bus bars 252, 254, 256 of FIG. 13, with a dielectric material 270 provided within the choke device 260 and between the bus bars 252, 254, 256.

Figure 15:
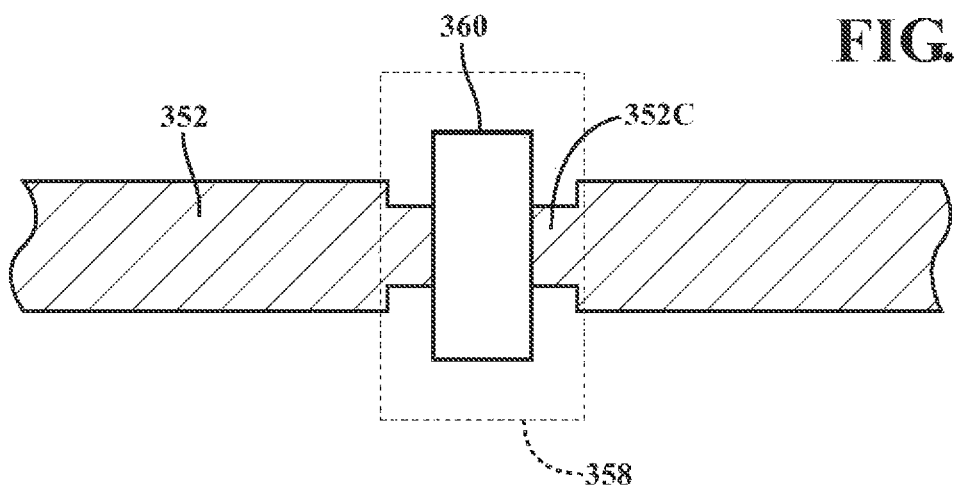
FIG. 15 schematically illustrates in top view a bus bar routed through a choke device, in accordance with the present disclosure.

FIG. 15 schematically illustrates in top view a bus bar 352 routed through a choke device 360. The bus bar 352 may represent the bus bar 152 of FIG. 13 or the bus bar 252 of FIG. 14. The bus bar 352 is narrowed in a narrow section 358, where the bus bar 352 includes a relatively thin or narrow portion 352C. The relatively thin or narrow portion 352C may include a thickness of the bus bar 352 becoming thinner and/or making an overall width of the bus bar 352 thinner. The relatively thin or narrow portion 352C may be duplicated on other bus bars routed through the choke device 360 and may enable a relatively reduced overall magnetic flux flow path in the choke device 360 due to the decreased size of the bus bar 352 in the narrow section 358. This allows a smaller choke with high magnetic flux.

Figure 16:
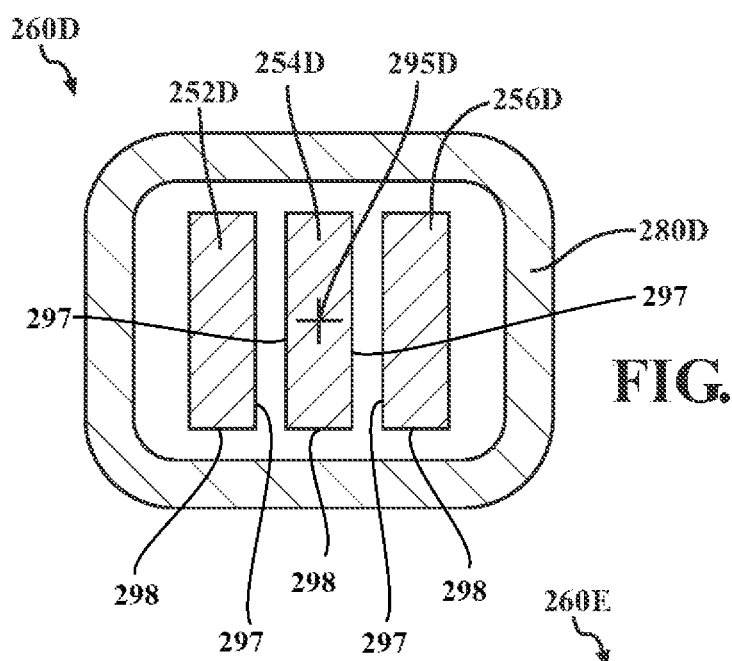
FIG. 16 schematically illustrates in cross-sectional view a first exemplary embodiment of the choke device of FIG. 14, in accordance with the present disclosure.

FIG. 16 schematically illustrates in cross-sectional view a first exemplary embodiment of the choke device 260 of FIG. 14 as choke device 260D. The choke device 260D is illustrated including bus bars 252D, 254D, 256D and a common-mode choke 280D which is provided as a rectangle or rounded rectangle shape. The bus bar 254D is illustrated coincident to a geometric center 295D of the choke device 260D. The bus bars 252D, 256D are illustrated equidistant from and symmetrically disposed in comparison to the geometric center 295D. Each of the bus bars 252D, 254D, 256D include a rectangular cross-section with two longer flat, planar sides 297 and two shorter edge sides 298. In order to achieve a closely positioned orientation of the bus bars 252D, 254D, 256D, the bus bars 252D, 254D, 256D are stacked in parallel such that at least one of the planar sides 297 of each of the bus bars 252D, 254D, 256D faces or abuts a planar side 297 of another of the bus bars 252D, 254D, 256D. By disposing the bus bars 252D, 254D, 256D in a closely positioned orientation, an overall flux length of the core of the common-mode choke is minimized.

Figure 17:
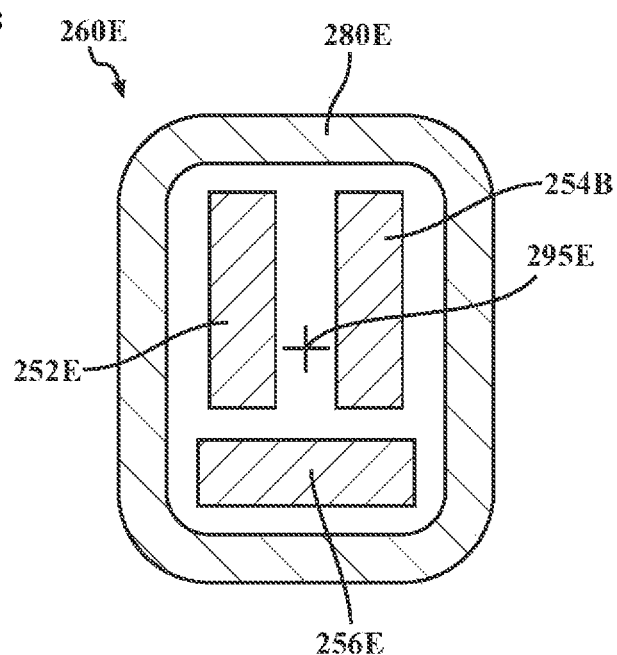
FIG. 17 schematically illustrates in cross-sectional view a second exemplary embodiment of the choke device of FIG. 14, in accordance with the present disclosure.

FIG. 17 schematically illustrates in cross-sectional view a second exemplary embodiment of the choke device 260 of FIG. 14 as choke device 260E. The choke device 260E is illustrated including a geometric center 295E, bus bars 252E, 254E, 256E, and a common-mode choke 280E which is provided as a rectangle shape. Each of the bus bars 252E, 254E, 256E include a rectangular cross-section with two longer flat, planar sides and two shorter edge sides. In order to achieve a closely positioned orientation of the bus bars 252E, 254E, 256E, the bus bars 252E, 254E are stacked in parallel. Further, the bus bar 256E is disposed perpendicular to the bus bars 252E, 254E. By disposing the bus bars 252E, 254E, 256E in a closely positioned orientation, an overall flux length of the core of the common-mode choke 280E is minimized.

Figure 18:
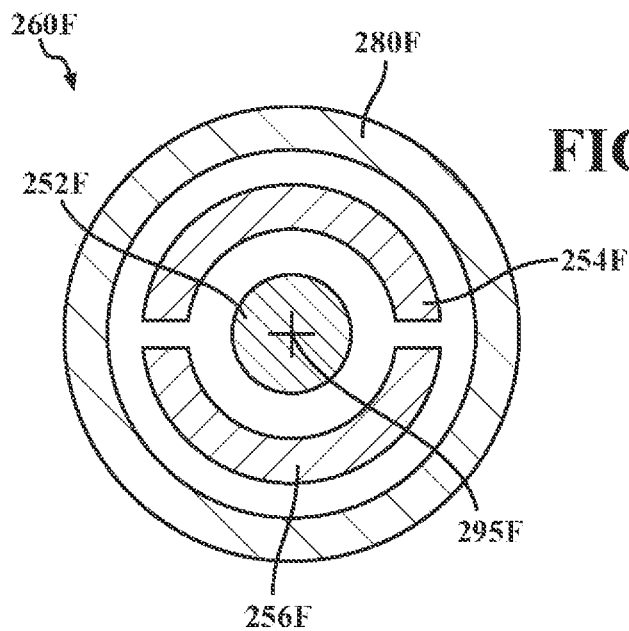
FIG. 18 schematically illustrates in cross-sectional view a third exemplary embodiment of the choke device of FIG. 14, in accordance with the present disclosure.

FIG. 18 schematically illustrates in cross-sectional view a third exemplary embodiment of the choke device 260 of FIG. 14 as choke device 260F. The choke device 260F is illustrated including bus bars 252F, 254F, 256F and a common-mode choke 280F which is provided as a circular shape. Bus bar 252F includes a centerline aligned with a geometric center 295F of the choke device 260F. Bus bars 254F, 256F are each configured as half-circle arcs and are each disposed about the bus bar 252F. By disposing the bus bars 252F, 254F, 256F in a closely positioned orientation, an overall flux length of the core of the common-mode choke 280F is minimized.

Figure 19:
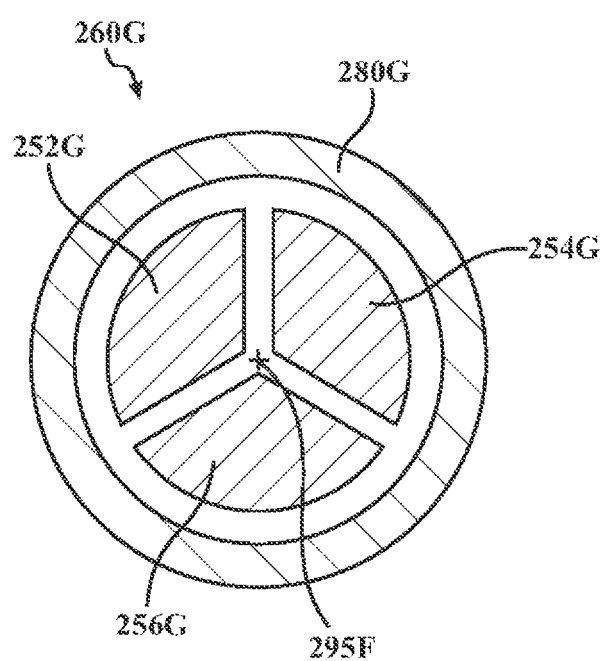
FIG. 19 schematically illustrates in cross-sectional view a fourth exemplary embodiment of the choke device of FIG. 14, in accordance with the present disclosure.

FIG. 19 schematically illustrates in cross-sectional view a fourth exemplary embodiment of the choke device 260 of FIG. 14 as choke device 260G. The choke device 260G is illustrated including bus bars 252G, 254G, 256G and a common-mode choke 280G which is provided as a circular shape. Each of the bus bars 252G, 254G, 256G include a segment of a circle shape, such that the segments of each of the bus bars 252G, 254G, 256G together or collectively constitute a full circle centered upon a geometric center 295G of the choke device 260G. By disposing the bus bars 252G, 254G, 256G in a closely positioned orientation, an overall flux length of the core of the common-mode choke 280G is minimized.

Figure 20:
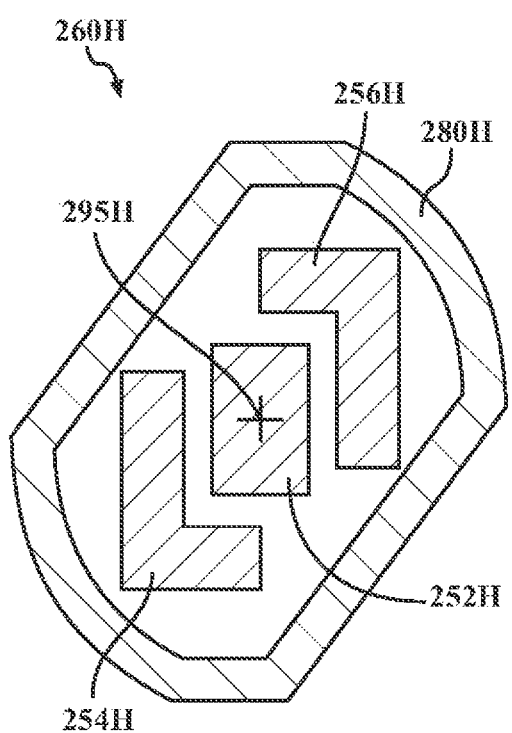
FIG. 20 schematically illustrates in cross-sectional view a fifth exemplary embodiment of the choke device of FIG. 14 as choke device, in accordance with the present disclosure.

FIG. 20 schematically illustrates in cross-sectional view a fifth exemplary embodiment of the choke device 260 of FIG.

14 as choke device 260H. The choke device 260H is illustrated including bus bars 252H, 254H, 256H and a common-mode choke 280H which is provided as an oblong shape. The bus bar 252H includes a rectangular cross-section and is centered upon a geometric center 295H of the choke device 260H. The bus bars 254H, 256H each include an L shape and are symmetrically disposed about the bus bar 252H. By disposing the bus bars 252H, 254H, 256H in a closely positioned orientation, an overall flux length of the core of the common-mode choke 280H is minimized.

Figure 21:
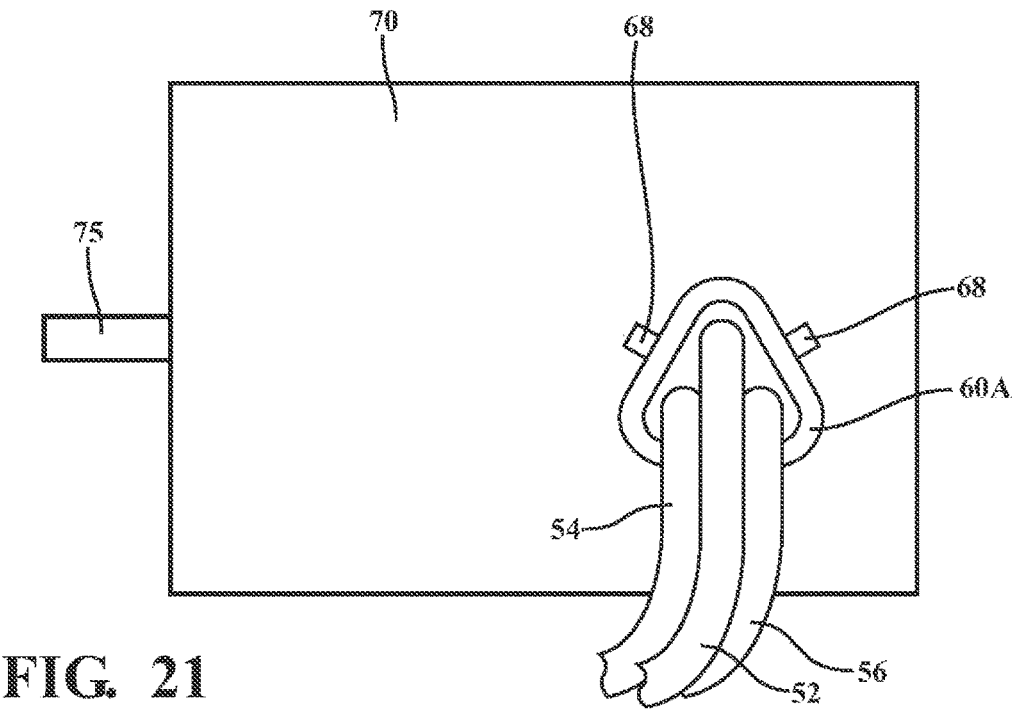
FIG. 21 schematically illustrates the electric machine of FIG. 1 including an output shaft, and the choke device of FIG. 2 attached to the electric machine, in accordance with the present disclosure.

Referring to FIG. 1, chokes may be installed inside the power inverter 40, on the outer surface of a housing of the power inverter 40, connectors of the inverter 40 or the electric machine 70, or on the electric transmission lines 52, 54, 56 between the power inverter 40 and the electric machine 70. FIG. 21 schematically illustrates the electric machine 70 of FIG. 1 including an output shaft 75, and the choke device 60A of FIG. 2 attached to the electric machine 70. The electric machine 70 operates in three phases or alternating current. The choke device 60A is configured in accordance with the present disclosure. The electric transmission lines 52, 54, 56 are illustrated as three exemplary cables converging upon the choke device 60A in order to pass through the choke device 60A in a triangular configuration. The choke device 60A includes mounting bosses 68 configured to enable connection of the choke device 60A to a housing of the electric machine 70, for example, with threaded fasteners. Alternative embodiments of choke device 60 of FIG. 1 from FIGS. 3-11 may alternatively be utilized with the electric machine 70. In the alternative to the electric transmission lines 52, 54, 56, bus bars such as the bus bars 252, 254, 256 of FIG. 14 may alternatively be utilized, with embodiments of the choke device 260 of FIG. 14 from FIGS. 16-20 may alternatively be utilized with the electric machine 70.

Figure 22:
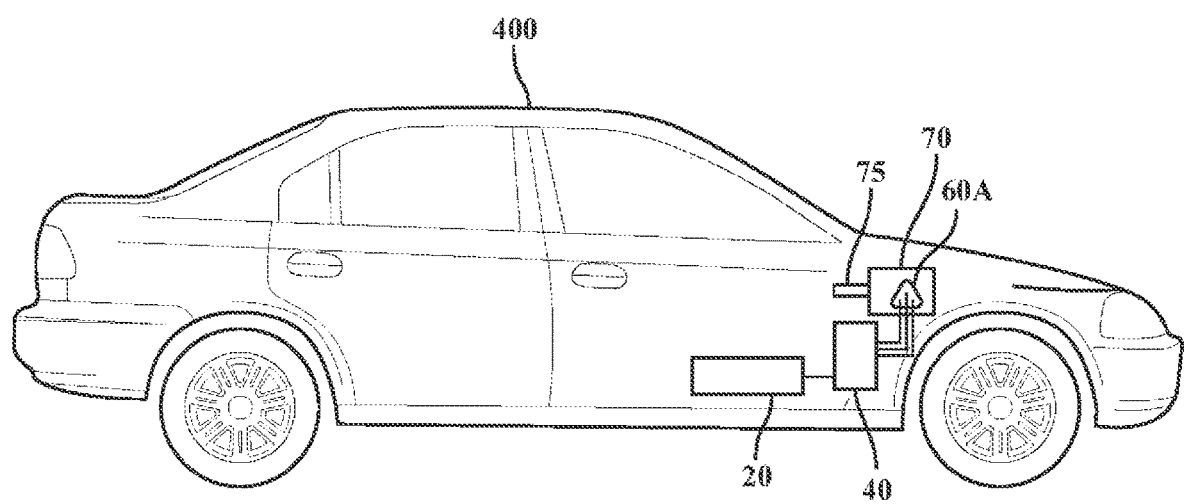
FIG. 22 schematically illustrates an exemplary device including the battery and the power inverter of FIG. 1 and the electric machine of FIG. 21, in accordance with the present disclosure.

FIG. 22 schematically illustrates an exemplary vehicle 400 including the battery 20 and the power inverter 40 of FIG. 1 and the electric machine 70 of FIG. 21. The battery 20 stores electrical energy and provides and receives electrical energy in direct current. The power inverter 40 includes a plurality of phase circuits which transform electrical energy between direct current useful to the battery 20 and alternating current in a plurality of phases useful to the electric machine 70. The electric machine 70 is illustrated including the choke device 60A of FIG. 21 and the output shaft 75 of FIG. 21, which is configured for providing useful work by providing an output torque useful for tasks such as providing motive force to the vehicle 400.

Figure 23:
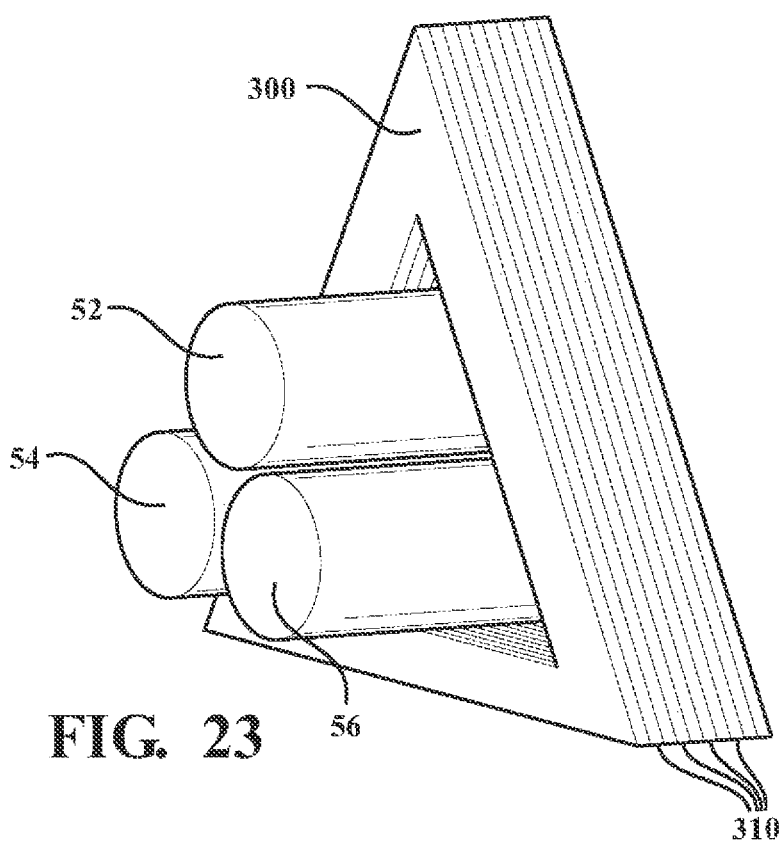
FIG. 23 schematically illustrates electric transmission lines including a common-mode choke constructed with a vertical lamination including a plurality of stacked ferrite sheets, in accordance with the present disclosure.
Figure 24:
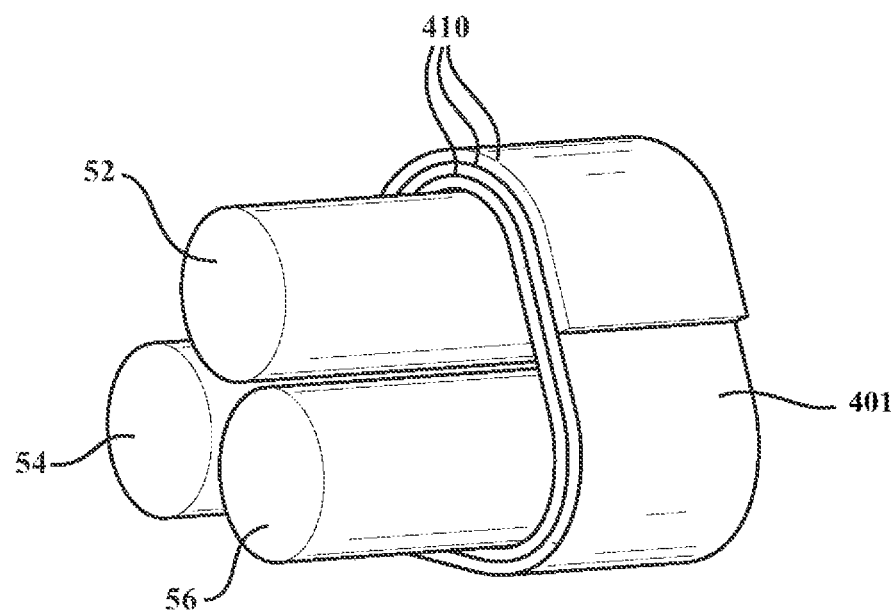
FIG. 24 schematically illustrates electric transmission lines including a horizontal lamination including a common-mode choke constructed with spirally wound layers of ferrite sheet or ferrite ribbon, in accordance with the present disclosure.

In one embodiment, heat generation within the choke device may be mitigated by adding vertical laminations in the common-mode choke to reduce eddy current loss. FIG. 23 schematically illustrates electric transmission lines 52, 54, 56 including a common-mode choke constructed with a vertical lamination 300 including a plurality of stacked ferrite sheets 310. FIG. 24 schematically illustrates electric transmission lines 52, 54, 56 including a horizontal lamination 401 including a common-mode choke constructed with spirally wound layers 410 of ferrite sheet or ferrite ribbon.

Figure 25:
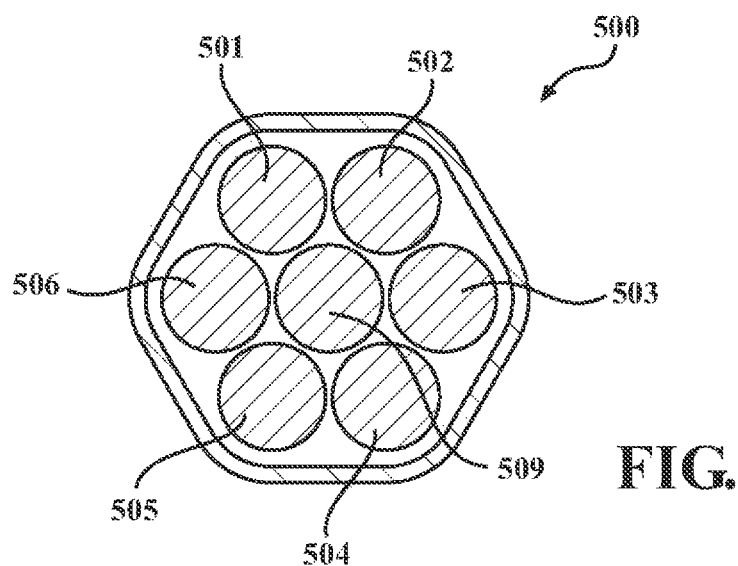
FIG. 25 schematically illustrates in cross-sectional view a first alternative exemplary embodiment of the choke device of FIG. 1, in accordance with the present disclosure.

A plurality of multi-phase choke configurations is envisioned. FIG. 25 schematically illustrates in cross-sectional view a first alternative exemplary embodiment of the choke device 60 of FIG. 1 as choke device 500. The choke device 500 includes electric transmission lines 501, 502, 503, 504, 505, 506, representing a six-phase choke configuration. An additional line 509 is illustrated, which may represent a seventh phase or may represent a ground conductor. The electric transmission lines 501, 502, 503, 504, 505, 506 are disposed equidistant from a geometric center of the choke device 500.

Figure 26:
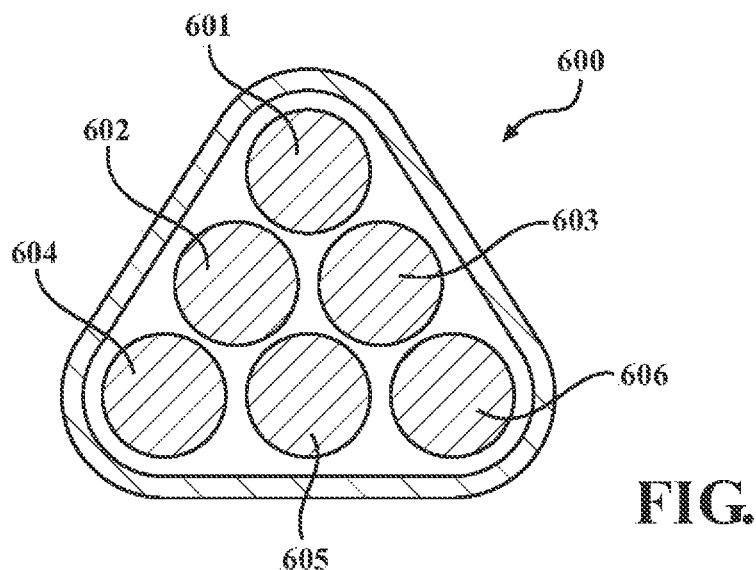
FIG. 26 schematically illustrates in cross-sectional view a first alternative exemplary embodiment of the choke device of FIG. 1, in accordance with the present disclosure.

FIG. 26 schematically illustrates in cross-sectional view a first alternative exemplary embodiment of the choke device 60 of FIG. 1 as choke device 600. The choke device 600 includes electric transmission lines 601, 602, 603, 604, 605, 606, representing a six-phase choke configuration. The electric transmission lines 601, 604, 606 are disposed equidistant from a geometric center of the choke device 600. The electric transmission lines 602, 603, 605 are disposed equidistant from the geometric center of the choke device 600.

Figure 27:
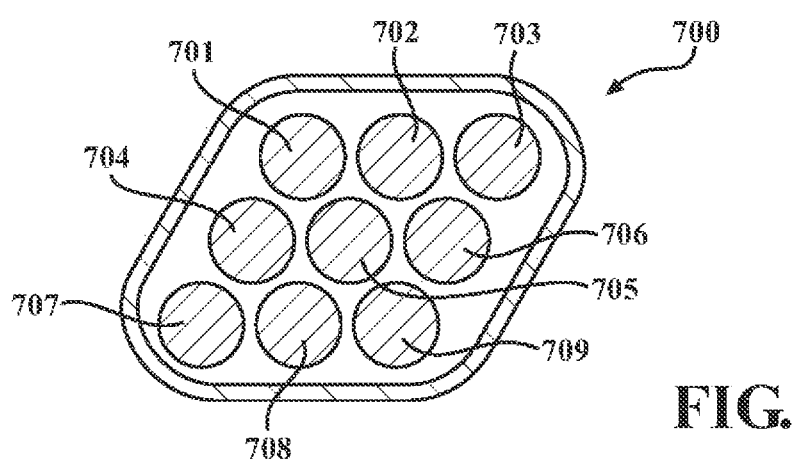
FIG. 27 schematically illustrates in cross-sectional view a first alternative exemplary embodiment of the choke device of FIG. 1, in accordance with the present disclosure.

FIG. 27 schematically illustrates in cross-sectional view a first alternative exemplary embodiment of the choke device 60 of FIG. 1 as choke device 700. The choke device 700 includes electric transmission lines 701, 702, 703, 704, 705, 706, 707, 708, 709 representing a nine-phase choke configuration. The electric transmission lines 703, 707 are disposed equidistant from a geometric center of the choke device 700. The electric transmission lines 701, 702, 704, 706, 708, 709 are disposed equidistant from the geometric center of the choke device 700. The electrical transmission line 705 is disposed coincident with the geometric center of the choke device 700.

Figure 28:
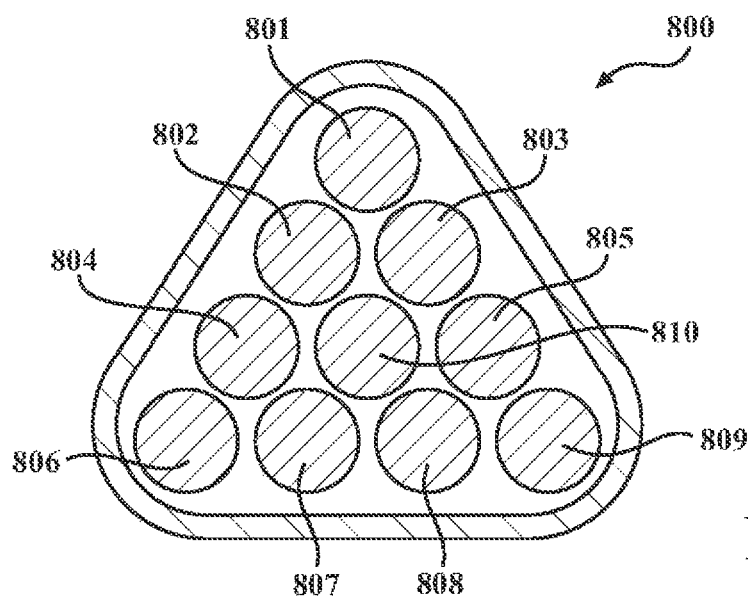
FIG. 28 schematically illustrates in cross-sectional view a first alternative exemplary embodiment of the choke device of FIG. 1, in accordance with the present disclosure.

FIG. 28 schematically illustrates in cross-sectional view a first alternative exemplary embodiment of the choke device 60 of FIG. 1 as choke device 800. The choke device 800 includes electric transmission lines 801, 802, 803, 804, 805, 806, 807, 808, 809 representing a nine-phase choke configuration. An additional line 810 is illustrated, which may represent a tenth phase or may represent a ground conductor. The electric transmission lines 802, 803, 804, 805, 807, 808 are disposed equidistant from a geometric center of the choke device 800. The electric transmission lines 801, 806, 809 are disposed equidistant from the geometric center of the choke device 800. The electric transmission line 810 are disposed coincident to the geometric center of the choke device 800.

Figure 29:
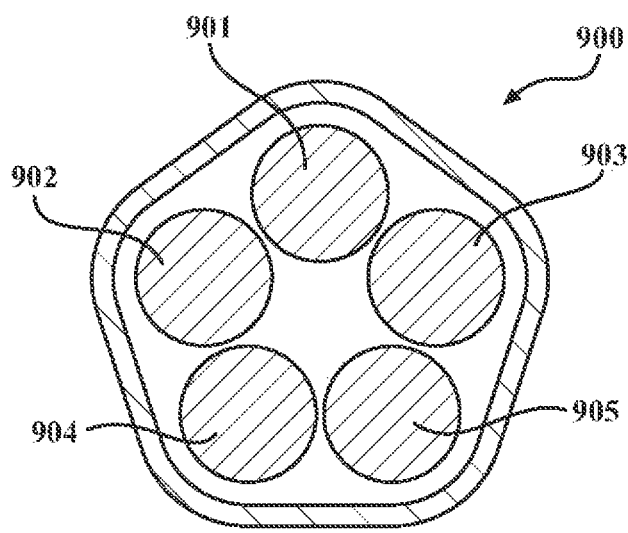
FIG. 29 schematically illustrates in cross-sectional view a first alternative exemplary embodiment of the choke device of FIG. 1, in accordance with the present disclosure.

FIG. 29 schematically illustrates in cross-sectional view a first alternative exemplary embodiment of the choke device 60 of FIG. 1 as choke device 900. The choke device 900 includes electric transmission lines 901, 902, 903, 904, 905 representing a five-phase choke configuration. The electric transmission lines 901, 902, 903, 904, 905 are disposed equidistant from a geometric center of the choke device 900.

According to one embodiment of the disclosure, a choke device for an electric machine system is provided. The choke device includes a common-mode choke including a magnetic core configured in cross-section as a geometric shape including a hollow center. The choke device further includes a plurality of electric transmission lines configured for transmitting electrical energy in alternating current. The plurality of electric transmission lines is routed through the hollow center. The geometric shape includes a number of sides based upon a number of the electric transmission lines present and is configured for minimizing or reducing an overall flux length of the magnetic core.

The plurality of electric transmission lines may be symmetrically arranged and configured for equally coupled fields, a same proximity effect among the plurality of electric transmission lines, a minimized zero sequence current, and a voltage which reduces a common-mode current.

The plurality of electric transmission lines may include symmetric shielding, may be equally distant from each other, and may be equally distant from the common-mode choke. The plurality of electric transmission lines may be further configured for coherently adding magnetic fields or flux through the common-mode choke and for strengthening the choke in balance, increasing a total inductance, and providing impedance to the common-mode current.

The choke device may further include dielectric material configured for increasing a permeability of the choke device to increase inductance.

The choke device may further include thermally conductive material configured for removing heat from the choke device.

The plurality of the electric transmission lines may include bus bars.

The bus bars outside of the choke device may bend inwardly to route through the common-mode choke and are configured for reducing flux length to increase inductance.

The bus bars may be relatively thicker outside of the choke device and may be relatively thinner inside of the choke device.

The bus bars may be relatively wider outside of the choke device and may be relatively narrower inside of the choke device.

The plurality of the electric transmission lines may be arranged within the choke device such that a centerline of each of the plurality of electric transmission lines is equidistant from a geometric center of the choke device.

The geometric shape may have a same number of sides as the number of the plurality of the electric transmission lines present.

The choke device may further include a ground conductor routed through the common-mode choke. The geometric shape may have a same number of sides as the number of the plurality of the electric transmission lines present plus one.

One of the plurality of electric transmission lines may be coincident with a geometric center of the choke device. A remainder of the plurality of electric transmission lines may be equally spaced around the one of the plurality of electric transmission lines. The geometric shape may have a same number of sides as the number of the plurality of the electric transmission lines present minus one.

The choke device may further include a ground conductor coincident with a geometric center of the choke device. A remainder of the plurality of electric transmission lines may be equally spaced around the one of the plurality of electric transmission lines. The geometric shape may have a same number of sides as the number of the plurality of the electric transmission lines present.

Each of the plurality of electric transmission lines may include shielding and insulation disposed between the electric transmission line and the shielding.

The common-mode choke may include a vertical lamination including a plurality of stacked ferrite sheets.

The common-mode choke may include a horizontal lamination including a spirally wound ferrite sheet or a spirally wound ferrite ribbon.

The geometric shape may include a triangle, a square, a pentagon, a hexagon, a septagon, an octagon, a nonagon, or a decagon.

A gap in the magnetic core may be maintained. The gap may be configured for reducing saturation.

According to one alternative embodiment, a system including a choke device for an electric machine is provided. The system includes a battery configured for receiving and providing electrical energy in direct current and an electric machine configured for receiving and providing electrical energy in a plurality of phases in alternating current. The system further includes a power inverter transforming electrical energy between direct current and alternating current. The system further includes the choke device located between the electric machine and the power inverter. The choke device includes a common-mode choke including a magnetic core configured in cross-section as a geometric shape including a hollow center. The choke device further includes a plurality of electric transmission lines configured for transmitting electrical energy in alternating current. The plurality of electric transmission lines is routed through the hollow center. The geometric shape includes a number of sides based upon a number of the electric transmission lines present and is configured for minimizing or reducing an overall flux length of the magnetic core.

According to one alternative embodiment, a device including a system including a choke device for an electric machine is provided. The device includes the system. The system includes a battery configured for receiving and providing electrical energy in direct current and an electric machine configured for receiving and providing electrical energy in a plurality of phases in alternating current. The system further includes a power inverter transforming electrical energy between direct current and alternating current. The system further includes the choke device located between the electric machine and the power inverter. The choke device includes a common-mode choke including a magnetic core configured in cross-section as a geometric shape including a hollow center. The choke device further includes a plurality of electric transmission lines configured for transmitting electrical energy in alternating current. The plurality of electric transmission lines is routed through the hollow center. The geometric shape includes a number of sides based upon a number of the electric transmission lines present and is configured for minimizing or reducing an overall flux length of the magnetic core.

While the best modes for carrying out the disclosure have been described in detail, those familiar with the art to which this disclosure relates will recognize various alternative designs and embodiments for practicing the disclosure within the scope of the appended claims.

What is claimed is:

1. A choke device for an electric machine system, the choke device comprising:
   a common-mode choke including a magnetic core configured in cross-section as a geometric shape including a hollow center; and
   a plurality of electric transmission lines configured for transmitting electrical energy in alternating current, wherein the plurality of electric transmission lines is routed through the hollow center; and
   wherein the geometric shape includes a number of sides based upon a number of the electric transmission lines present and is configured for minimizing or reducing an overall flux length of the magnetic core.

2. The choke device of claim 1, wherein the plurality of electric transmission lines is symmetrically arranged and configured for equally coupled fields, a same proximity effect among the plurality of electric transmission lines, a minimized zero sequence current, and a voltage which reduces a common-mode current.

3. The choke device of claim 2, wherein the plurality of electric transmission lines include symmetric shielding, are equally distant from each other, and are equally distant from the common-mode choke; and
   wherein the plurality of electric transmission lines is further configured for coherently adding magnetic fields or flux through the common-mode choke and for strengthening the choke in balance, increasing a total inductance, and providing impedance to the common-mode current.

4. The choke device of claim 1, further comprising dielectric material configured for increasing a permeability of the choke device to increase inductance.

5. The choke device of claim 1, further comprising thermally conductive material configured for removing heat from the choke device.

6. The choke device of claim 1, wherein the plurality of the electric transmission lines includes bus bars.

7. The choke device of claim 6, wherein the bus bars outside of the choke device bend inwardly to route through the common-mode choke and are configured for reducing flux length to increase inductance.

8. The choke device of claim 6, wherein the bus bars are relatively thicker outside of the choke device and are relatively thinner inside of the choke device.

9. The choke device of claim 6, wherein the bus bars are relatively wider outside of the choke device and are relatively narrower inside of the choke device.

10. The choke device of claim 1, wherein the plurality of the electric transmission lines is arranged within the choke device such that a centerline of each of the plurality of electric transmission lines is equidistant from a geometric center of the choke device.

11. The choke device of claim 1, wherein the geometric shape has a same number of the sides as the number of the plurality of the electric transmission lines present.

12. The choke device of claim 1, further comprising a ground conductor routed through the common-mode choke; and
the geometric shape has a same number of the sides as the number of the plurality of the electric transmission lines present plus one.

13. The choke device of claim 1, wherein one of the plurality of electric transmission lines is coincident with a geometric center of the choke device;
wherein a remainder of the plurality of electric transmission lines is equally spaced around the one of the plurality of electric transmission lines; and
wherein the geometric shape has a same number of the sides as the number of the plurality of the electric transmission lines present minus one.

14. The choke device of claim 1, further comprising a ground conductor coincident with a geometric center of the choke device;
wherein a remainder of the plurality of electric transmission lines is equally spaced around the one of the plurality of electric transmission lines; and
wherein the geometric shape has a same number of the sides as the number of the plurality of the electric transmission lines present.

15. The choke device of claim 1, wherein each of the plurality of electric transmission lines includes:
shielding; and
insulation disposed between the electric transmission line and the shielding.

16. The choke device of claim 1, wherein the common-mode choke includes a vertical lamination including a plurality of stacked ferrite sheets or a horizontal lamination including a spirally wound ferrite sheet or a spirally wound ferrite ribbon.

17. The choke device of claim 1, wherein the geometric shape includes a triangle, a square, a pentagon, a hexagon, a septagon, an octagon, a nonagon, or a decagon.

18. The choke device of claim 1, wherein a gap in the magnetic core is maintained, wherein the gap is configured for reducing saturation.

19. A system including a choke device for an electric machine, the system comprising:
a battery configured for receiving and providing electrical energy in direct current;
an electric machine configured for receiving and providing electrical energy in a plurality of phases in alternating current;
a power inverter transforming electrical energy between direct current and alternating current; and
the choke device located between the electric machine and the power inverter, the choke device including:
a common-mode choke including a magnetic core configured in cross-section as a geometric shape including a hollow center; and
a plurality of electric transmission lines configured for transmitting electrical energy in alternating current, wherein the plurality of electric transmission lines is routed through the hollow center; and
wherein the geometric shape includes a number of sides based upon a number of the electric transmission lines present and is configured for minimizing or reducing an overall flux length of the magnetic core.

20. A device including a system including a choke device for an electric machine, the device comprising:
the system, including:
a battery configured for receiving and providing electrical energy in direct current;
an electric machine configured for receiving and providing electrical energy in a plurality of phases in alternating current;
a power inverter transforming electrical energy between direct current and alternating current; and
the choke device located between the electric machine and the power inverter, the choke device including:
a common-mode choke including a magnetic core configured in cross-section as a geometric shape including a hollow center; and
a plurality of electric transmission lines configured for transmitting electrical energy in alternating current, wherein the plurality of electric transmission lines is routed through the hollow center; and
wherein the geometric shape includes a number of sides based upon a number of the electric transmission lines present and is configured for minimizing or reducing an overall flux length of the magnetic core.

* * * * *